United States Patent
Saito et al.

(10) Patent No.: US 9,542,095 B2
(45) Date of Patent: Jan. 10, 2017

(54) DISPLAY CONTROL DEVICE, DISPLAY CONTROL METHOD, AND RECORDING MEDIUM

(71) Applicant: SONY CORPORATION, Tokyo (JP)

(72) Inventors: Keisuke Saito, Kanagawa (JP); Kae Okazawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 24 days.

(21) Appl. No.: 14/654,444

(22) PCT Filed: Nov. 12, 2013

(86) PCT No.: PCT/JP2013/080604
§ 371 (c)(1),
(2) Date: Jun. 19, 2015

(87) PCT Pub. No.: WO2014/103544
PCT Pub. Date: Jul. 3, 2014

(65) Prior Publication Data
US 2015/0346997 A1 Dec. 3, 2015

(30) Foreign Application Priority Data
Dec. 26, 2012 (JP) .................. 2012-282034

(51) Int. Cl.
*G06F 3/0488* (2013.01)
*G06F 3/041* (2006.01)
*G09G 5/14* (2006.01)
*G06K 9/20* (2006.01)
(Continued)

(52) U.S. Cl.
CPC ......... *G06F 3/04883* (2013.01); *G06F 3/0412* (2013.01); *G06F 3/0414* (2013.01); *G06F 3/0482* (2013.01); *G06F 3/04886* (2013.01); *G06K 9/20* (2013.01); *G09G 5/14* (2013.01); *G09G 5/38* (2013.01); *G06F 2203/04104* (2013.01); *G09G 2310/0232* (2013.01)

(58) Field of Classification Search
CPC   G06F 3/04886; G06F 3/02883; G06F 3/0412; G06F 3/0414; G06F 3/0482; G06K 9/20; G09G 5/14; G09G 5/38
USPC .......................................................... 345/173
See application file for complete search history.

(56) References Cited

U.S. PATENT DOCUMENTS

2008/0218534 A1* 9/2008 Kim .................... G06F 3/0482
345/681
2010/0097338 A1* 4/2010 Miyashita ........... G06F 3/04883
345/173
(Continued)

FOREIGN PATENT DOCUMENTS

JP  2001-034250 A  2/2001
JP  2006-099733 A  4/2006
(Continued)

*Primary Examiner* — Fred Tzeng
(74) *Attorney, Agent, or Firm* — Chip Law Group

(57) ABSTRACT

Provided is a display control device including a display controller which generates a control signal for controlling a display part in such a manner that a boundary line between a content display region and a region adjacent to the content display region has a wave-like shape and the boundary line is displayed while being fluctuated with progress of time, and an output part which outputs the control signal to the display part.

17 Claims, 19 Drawing Sheets

(51) Int. Cl.
    *G09G 5/38*    (2006.01)
    *G06F 3/0482*    (2013.01)

(56)  References Cited

U.S. PATENT DOCUMENTS

| | | | |
|---|---|---|---|
| 2010/0186037 A1* | 7/2010 | Alba | G06F 3/04847 725/40 |
| 2012/0056819 A1* | 3/2012 | Peterson | G06F 3/04886 345/173 |
| 2015/0234850 A1* | 8/2015 | Brown, Jr. | G06F 17/30126 715/723 |

FOREIGN PATENT DOCUMENTS

| | | |
|---|---|---|
| JP | 2010-020616 A | 1/2010 |
| JP | 2011-022811 A | 2/2011 |
| JP | 2012-248034 A | 12/2012 |

* cited by examiner

DISPLAY CONTROL DEVICE, DISPLAY CONTROL METHOD, AND RECORDING MEDIUM

TECHNICAL FIELD

The present disclosure relates to a display control device, a display control method, and a recording medium.

BACKGROUND ART

In recent years, the number of pieces of content handled by users has been increased with the developments in communication technology and increase in storage capacities of recording media. Accordingly, various technologies have been disclosed for viewing content group with a simple operation. For example, a technique of displaying the content groups arranged in the shape of a list (for example, Patent Literature 1.). Patent Literature 1 describes using a time-series order of the update of each content group as an example of the arrangement order of the content groups.

According to the technique, the content groups arranged in the shape of a list are displayed, and therefore the content groups can be simply viewed.

CITATION LIST

Patent Literature

Patent Literature 1: JP 2011-22811A

SUMMARY OF INVENTION

Technical Problem

However, in such a technique, a displayed region of the content has a static rectangular shape, so that a very strong impression cannot be given to users. Therefore, the technique is not sufficient as a technique of allowing users to view content while giving a stronger impression to the users. Therefore, it is desirable to realize a technique of allowing users to view content while giving a stronger impression to the users.

Solution to Problem

According to the present disclosure, there is provided a display control device including a display controller which generates a control signal for controlling a display part in such a manner that a boundary line between a content display region and a region adjacent to the content display region has a wave-like shape and the boundary line is displayed while being fluctuated with progress of time, and an output part which outputs the control signal to the display part.

According to the present disclosure, there is provided a display control method including generating a control signal for controlling a display part in such a manner that a boundary line between a content display region and a region adjacent to the content display region has a wave-like shape and the boundary line is displayed while being fluctuated with progress of time, and outputting the control signal to the display part.

According to the present disclosure, there is provided a computer-readable recording medium having a program recorded thereon, the program causing a computer to function as a display control device, the display control device including a display controller which generates a control signal for controlling a display part in such a manner that a boundary line between a content display region and a region adjacent to the content display region has a wave-like shape and the boundary line is displayed while being fluctuated with progress of time, and an output part which outputs the control signal to the display part.

Advantageous Effects of Invention

As described above, the present disclosure allows users to view content while giving a stronger impression to the users.

DESCRIPTION OF EMBODIMENTS

Figure 1:
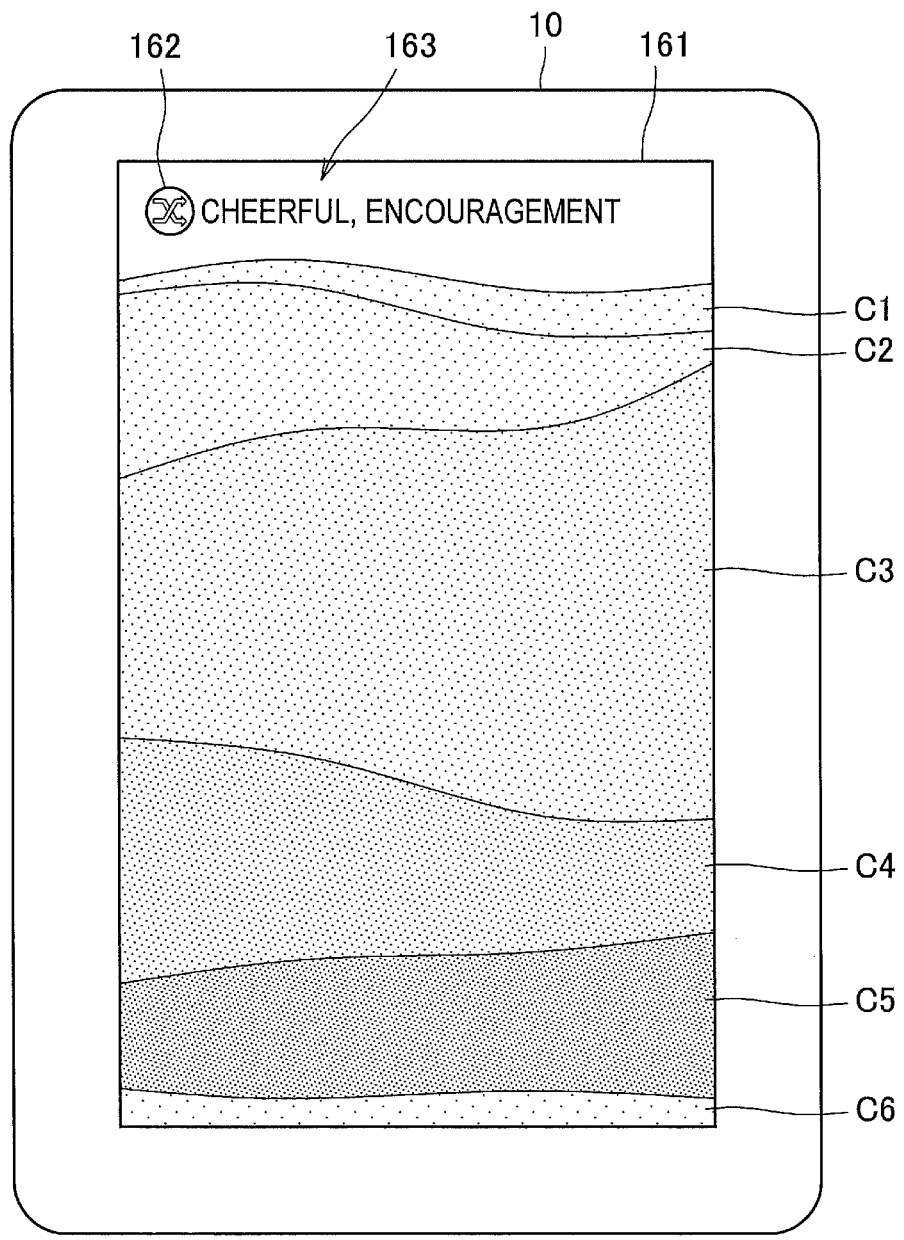
FIG. 1 is a diagram showing an appearance example of a display control device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

The "Description of Embodiments" is described according to the item order shown below.
1. Embodiment
 1-1. Appearance Example of Display Control Device
 1-2. Example of Technique of Reading Content
 1-3. Example of Functional Configuration of Display Control Device
 1-4. Outline of Functions of Display Control Device
 1-5. Example of Fluctuations of Boundary Lines
 1-6. Case where End of List Reaches Display Screen
 1-7. Another Appearance Example of Display Control Device
 1-8. Transmission and Reception of Content between Devices
 1-9. Hardware Configuration Example
2. Conclusion

1. Embodiment

First, an embodiment of the present disclosure is described.

[1-1. Appearance Example of Display Control Device]

First, an appearance example of a display control device 10 according to an embodiment of the present disclosure is described. FIG. 1 is a view showing an appearance example of the display control device 10 according to an embodiment of the present disclosure. The display control device 10 can be controlled in such a manner that a list in which a plurality of regions where content is displayed (hereinafter also referred to as a "content display region") are arranged is displayed on a display screen 161. For example, the display control device 10 can be controlled in such a manner that content display regions C1 to C6 are displayed on the display screen 161 as an example of the list as shown in FIG. 1.

In the example shown in FIG. 1, six content display regions are included in the list but the number of the content display regions included in the list is not particularly limited. In the present embodiment, a case is assumed in which the list is generated by overlapping of a plurality of pieces of content in order as shown in FIG. 1. However, such list generation is merely an example and a manner of generating the list based on the plurality of pieces of content is not particularly limited.

The type of the content is not particularly limited. For example, the content may be image data, text data, or other types of content. The image data may be image data of a still image or may be image data of a moving image. In the example shown in FIG. 1, the display control device 10 includes the display screen 161. However, the display screen 161 may be provided outside the display control device 10 or may be connected to the display control device 10 via a network.

As shown in FIG. 1, the display screen 161 may include a selected display mode display region 162. In the selected display mode display region 162, a currently selected display mode is displayed. Herein, the display mode may include an "Entrustment mode" in which the determination of the arrangement order of content display regions is entrusted to the display control device 10 as shown in FIG. 1. Moreover, the display mode may include a "Priority order mode" in which content display regions are arranged in order according to priority and may also include a "Time-series order mode" in which content display regions are arranged in order according to the time associated with the display content, a "Social mode" in which content display regions provided from other users are arranged, and the like.

Moreover, the display screen 161 may include a selected keyword display region 163 as shown in FIG. 1. In the selected keyword display region 163, a currently selected keyword is displayed. For example, a display controller 111 may display content display regions according to the currently selected keyword as a list on the display screen 161. In the example shown in FIG. 1, content display regions corresponding to currently selected keywords "Cheerful" and "Encouragement" are displayed as a list on the display screen 161.

Herein, when the content display region has a static rectangular shape, for example, a stronger impression cannot be given to users. Therefore, it is desirable to realize a technique of allowing users to view content while giving a stronger impression to the users. Then, this specification proposes a technique of controlling a display part in such a manner that the boundary lines between a content display region and a region adjacent to the content display region have a wave-like shape and the boundary lines are displayed while being fluctuated with the progress of time as shown in FIG. 1. Thus, it is expected to allow users to view content while giving a stronger impression to the users.

In the description above, an appearance example of the display control device 10 according to an embodiment of the present disclosure is described. The content to be provided to a controller 110 may be content stored by a storage 130 or may be content streaming-distributed from a predetermined server. When the content stored by the storage 130 is provided to the controller 110, content received from another device may be stored by the storage 130 or content read by a reading device 20 may be stored by the storage 130.

[1-2. Example of Technique of Reading Content]

Figure 2:
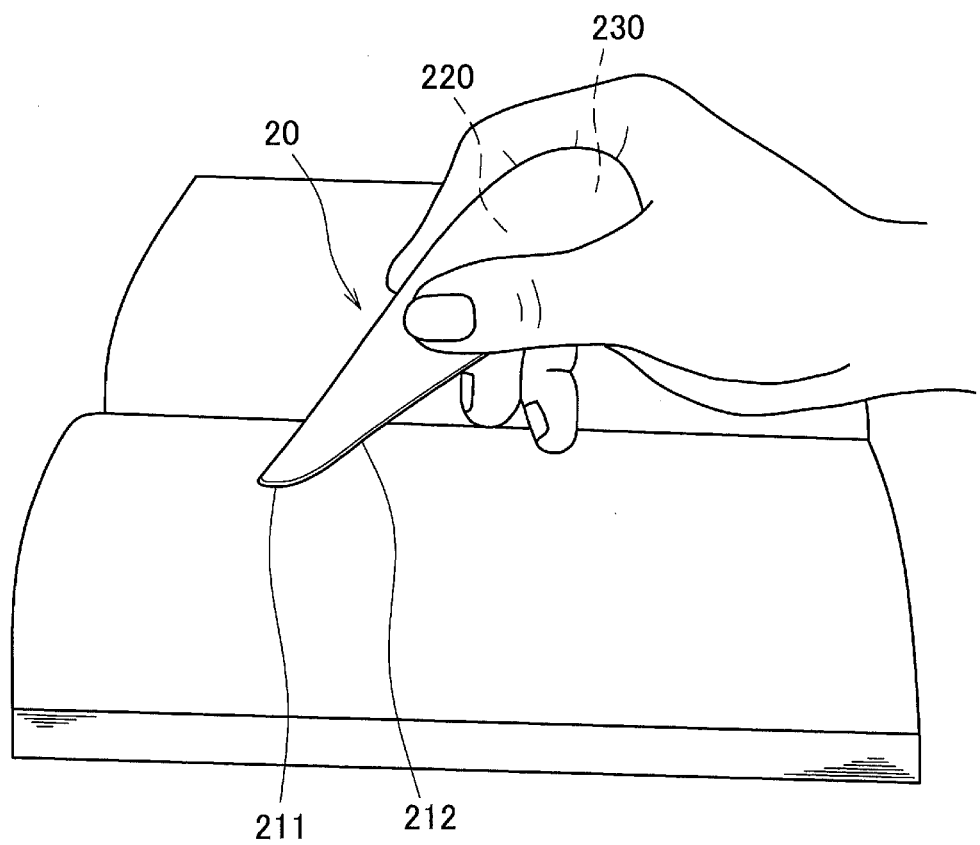
FIG. 2 is a view illustrating an example of a technique of reading content.

Hereinafter, a description of an example in which content read by the reading device 20 is stored by the storage 130 is given. FIG. 2 is a view showing an example of a technique of reading content. As shown in FIG. 2, the reading device 20 has a reading part 211. For example, when users view pages (for example, books, magazines, advertisements, and the like) and find a portion to be recorded (for example, texts, pictures, photographs, and the like) on the pages, the users can make the reading part 211 to read the portion. The portion read by the reading part 211 is stored as content by the storage 130. The portion to be recorded may be a portion by which the user is impressed.

As shown in FIG. 2, the reading device 20 may have, in addition to the reading part 211, a reading part 212 which reads a range wider than the range read by the reading part 211. As shown in FIG. 2, the reading device 20 may have a priority input part 220 which inputs the priority of the content. The priority input part 220 may contain a pressure sensor, for example. In this case, the priority input part 220 can input the priority according to the level of the power given by users to the pressure sensor. However, the priority input part 220 may not have the pressure sensor.

The priority input part 220 may contain a pulse sensor, for example. In this case, the priority input part 220 can input the priority according to the user's heart rate. For example, when the user's heart rate is higher, it is estimated that the user's degree of impression to the content is higher, and therefore the priority input part 220 may input a high priority. The priority input part 220 may further contain an acceleration sensor, for example. In this case, the priority input part 220 can input priority according to the acceleration given to the acceleration sensor.

The priority input part 220 can also input priority through an operation part 120, for example. In this case, the priority input part 220 can input priority according to an operation given to the operation part 120 by users. Herein, the type of operations given to the operation part 120 is not particularly limited and, for example, priority according to the movement (for example, speed, acceleration, and the like of a finger) of a finger moving while a user is touching a content display region may be input.

As shown in FIG. 2, the reading device 20 may have a priority output part 230 for outputting the input priority. The priority output part 230 may be configured from a light, for example. In this case, the priority output part 230 can emit light of the intensity according to the input priority. However, the priority output part 230 may be configured from a component other than a light. For example, the priority output part 230 may be configured from a vibration generating device which gives vibration to users. In this case, the priority output part 230 can generate vibration of the strength according to the input priority.

The content read by the reading device 20 as described above may be stored by the storage 130, and then provided to the controller 110. The input priority may also be stored by the storage 130, and then provided to the controller 110. In this specification, the case where the priority is input is mainly described but the priority may not be always input. For example, the priority may be calculated by the display control device 10.

[1-3. Example of Functional Configuration of Display Control Device]

Figure 3:
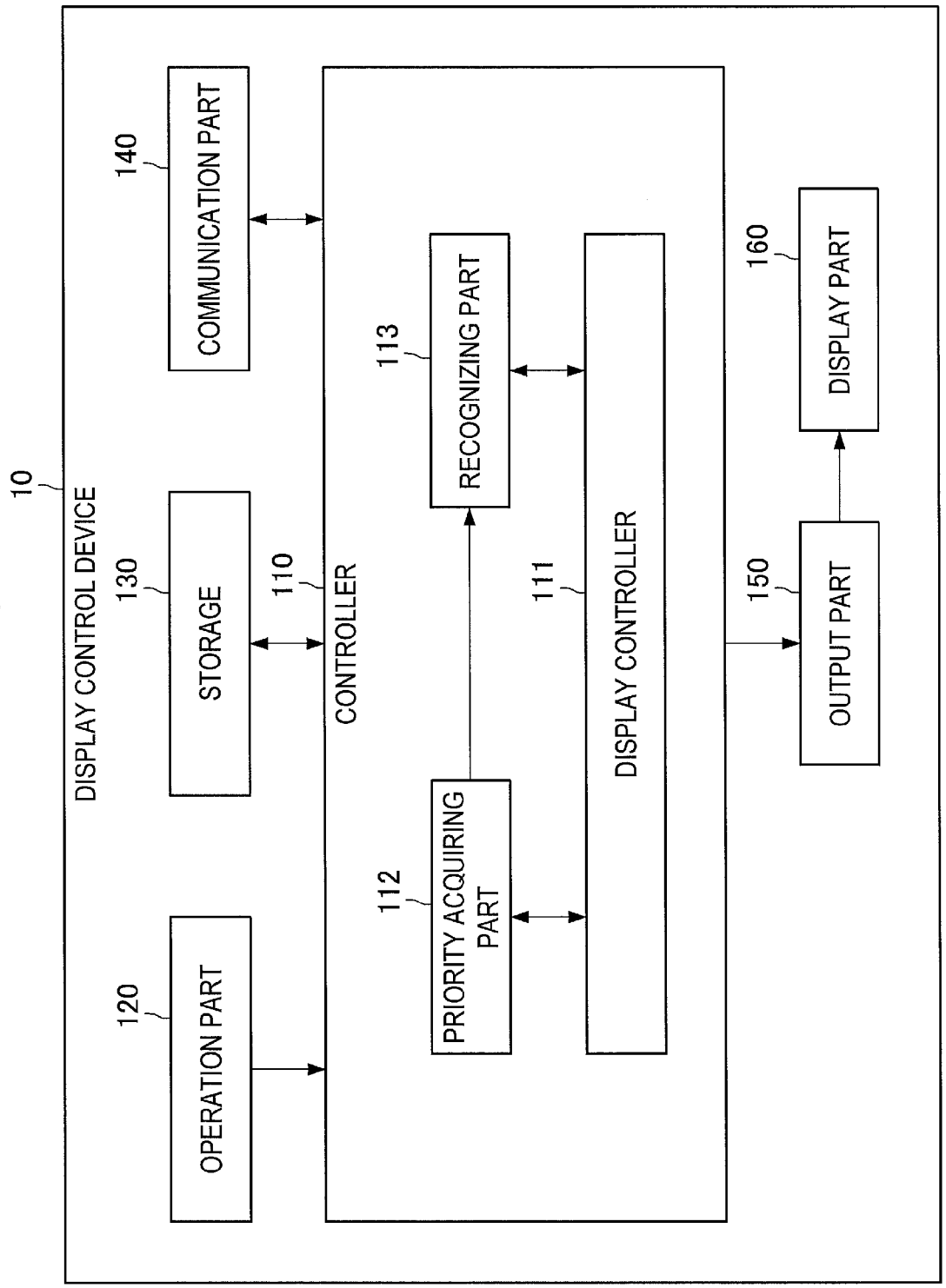
FIG. 3 is a view showing an example of the functional configuration of a display control device according to an embodiment of the present disclosure.

Then, an example of the functional configuration of the display control device 10 according to an embodiment of the present disclosure is described. FIG. 3 is a view showing an example of the functional configuration of the display control device 10 according to an embodiment of the present disclosure. As shown in FIG. 3, the display control device 10 has the controller 110, the operation part 120, the storage 130, a communication part 140, an output part 150, and a display part 160.

The controller 110 is equivalent to a processor, such as CPU (Central Processing Part), for example. The controller 110 executes a program stored in the storage 130 or another storage medium to thereby demonstrate various functions of the controller 110. The controller 110 has a display controller 111, a priority acquiring part 112, and a recognizing part 113. The display controller 111 generates a control signal for controlling the display part 160 in such a manner that the boundary lines between a content display region and a region adjacent to the content display region have a wavelike shape and the boundary lines are displayed while being fluctuated with the progress of time. The functions of each of the priority acquiring part 112 and the recognizing part 113 are described later.

The operation part 120 detects a user operation and outputs the user operation to the controller 110. Since the present specification assumes the case where the operation part 120 is configured from a touch panel, the user operation is input using a user's finger as an operating object. However, the operation part 120 may be configured from hardware other than the touch panel. Note that, although the operation part 120 is provided in an integrated manner with the display control device 10 in the example shown in FIG. 2, the operation part 120 may also be configured separately from the display control device 10.

The storage 130 stores a program for operating the controller 110 using a storage medium such as semiconductor memory or a hard disk. Further, for example, the storage 130 can also store various types of data (for example, various types of setting information and content) used by a program. Note that, although the storage 130 is provided in an integrated manner with the display control device 10 in the example shown in FIG. 3, the storage 130 may also be configured separately from the display control device 10.

The communication part 140 can communicate with the other display control devices 10. The type of the communication by the communication part 140 is not particularly limited and the communication by the communication part 140 may be communication by radio or may be communication by cable. Although the communication part 140 is provided in an integrated manner with the display control device 10 in the example shown in FIG. 3, the communication part 140 may also be configured separately from the display control device 10.

The output part 150 outputs a control signal generated by the display controller 111 to the display part 160. For example, when the display part 160 is provided in an integrated manner with the controller 110, the output part 150 is equivalent to an interface of connecting a bus to which the display part 160 and the controller 110 are connected and the controller 110. When the display part 160 is configured separately from the controller 110 through a network, the output part 150 is equivalent to an interface for connecting the controller 110 and the network, for example.

The display part 160 displays various types of information in accordance with control performed by the display controller 111. For example, the display part 160 is configured from a liquid crystal display (LCD), an organic electroluminescence (EL) display device, and the like. Note that, although the display part 160 is provided in an integrated manner with the display control device 10 in the example shown in FIG. 3, the display part 160 may also be configured separately from the display control device 10.

In the description above, an example of the functional configuration of the display control device 10 according to an embodiment of the present disclosure is described.

[1-4. Outline of Functions of Display Control Device]

Figure 4:
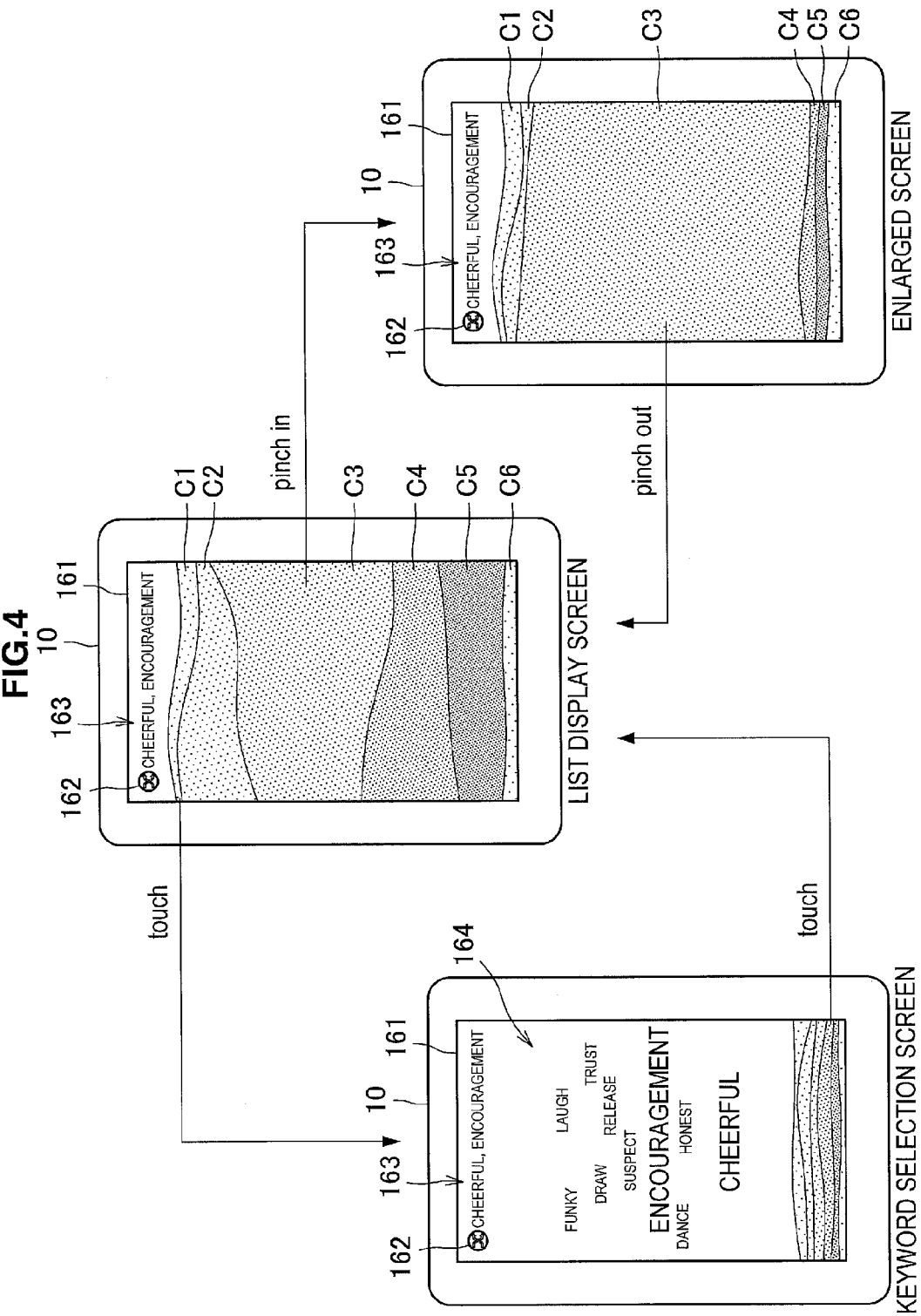
FIG. 4 is a view for describing the outline of the function of a display control device according to an embodiment of the present disclosure.

Then, the outline of the functions of the display control device 10 according to an embodiment of the present disclosure is described. FIG. 4 is a view for describing the outline of the functions of the display control device 10 according to an embodiment of the present disclosure. The following description is given mainly based on an example in which a selection operation is performed by a touch operation, an enlargement operation is performed by a pinch in operation, and a reduction operation is performed by a pinch out operation but the selection operation, the enlargement operation, and the reduction operation may be realized by any operation.

First, the display controller 111 controls the display part in such a manner that a keyword selection screen for selecting a keyword is displayed. The keyword selection screen contains keywords 164. The keywords 164 are associated with content and are obtained by extraction from a comment written from a user who views the content, for example. Users can select a desired keyword from the keywords 164 displayed on the keyword selection screen.

For example, when a touch operation is performed by a user in the keyword selection screen, the display controller 111 controls the display part in such a manner that a list display screen in which a plurality of content display regions are arranged is displayed. For example, as shown in FIG. 4, the display controller 111 can control the display part in such a manner that the list display screen in which the content display regions C1 to C6 according to the selected keywords are arranged is displayed. When a touch operation is performed by a user in the list display screen, the display controller 111 controls the display part in such a manner that the keyword selection screen is displayed.

On the other hand, when a pinch in operation to the content display region is performed by a user in the list display screen, the display controller 111 controls the display part in such a manner that an enlarged screen in which the size of the content display region is enlarged is displayed as shown in FIG. 4. When a pinch out operation to the content display region is performed by a user in the enlarged screen, the display controller 111 controls the display part in such a manner that the list display screen in which the size of the content display region is returned to the original size is displayed as shown in FIG. 4.

In the description above, the outline of the functions of the display control device 10 according to an embodiment of the present disclosure is described.

[1-5. Example of Fluctuations of Boundary Lines]

Figure 5:
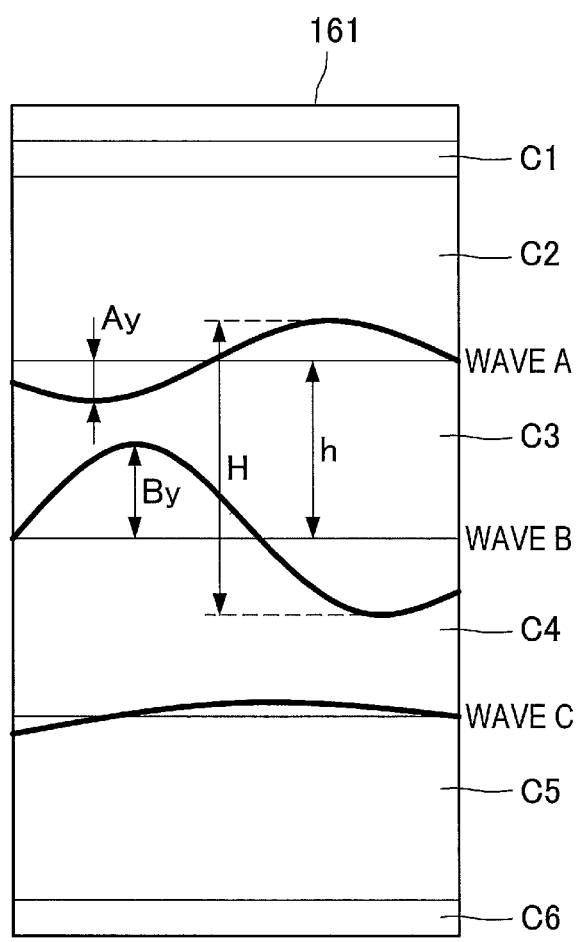
FIG. 5 is a view for describing an example of fluctuations of boundary lines.

FIG. 5 is a view for describing an example of fluctuations of the boundary lines. As shown in FIG. 5, the boundary line may be a boundary line between a content display region and another content display region adjacent to the content display region. Herein, the wave-like shape of the boundary line between a content display region C2 and a content display region C3 adjacent thereto is a wave A, the wave-like shape of the boundary line between the content display region C3 and a content display region C4 adjacent thereto is a wave B, and the wave-like shape of the boundary line between the content display region C4 and a content display region C5 adjacent thereto is a wave C, for example.

In this case, when the amplitude of the wave A is Ay, the amplitude of the wave B is By, and the distance between the reference positions of the wave A and the wave B is h, the display controller 111 may determine the Ay, the By, and the h in such a manner as to satisfy the following formula (1) in order to avoid the crossing of the wave A and the wave B.

$$h > Ay + By \quad (1)$$

When the height of the content display region is H, the display controller 111 may determine the Ay, the By, the h, and the H in such a manner as to satisfy the following formula (2) in order to avoid the formation of a blank in the display screen 161.

$$H = h + Ay + By \quad (2)$$

The boundary lines are controlled to have a wave-like shape and be displayed while being fluctuated with the progress of time as described above and the fluctuations of the boundary lines may be any fluctuation. The following description is given mainly taking, as an example, the case where the wave-like shape of the boundary lines is a stationary wave having a node equivalent to a portion which does not vibrate and an antibody equivalent to a portion which vibrates. The wave-like shape of the boundary lines may be a travelling wave which moves in a predetermined direction in a state where the shape itself is fixed.

Herein, the display controller 111 selects a region serving as a display target in content (hereinafter also referred to as a "display target region"), various techniques are assumed as a technique of selecting the display target region. For example, the recognizing part 113 may acquire the position of a predetermined region contained in content as a recognition result by the recognition of the content, and then the display controller 111 may fluctuate the boundary lines according to the recognition result acquired by the recognizing part 113. More specifically, the display controller 111 may change the position of the display target region in content according to the position of the predetermined region. Herein, the predetermined region may be any region. For example, when predetermined text data is contained in content, the predetermined region may be a region where the predetermined text data is present.

Figure 6:
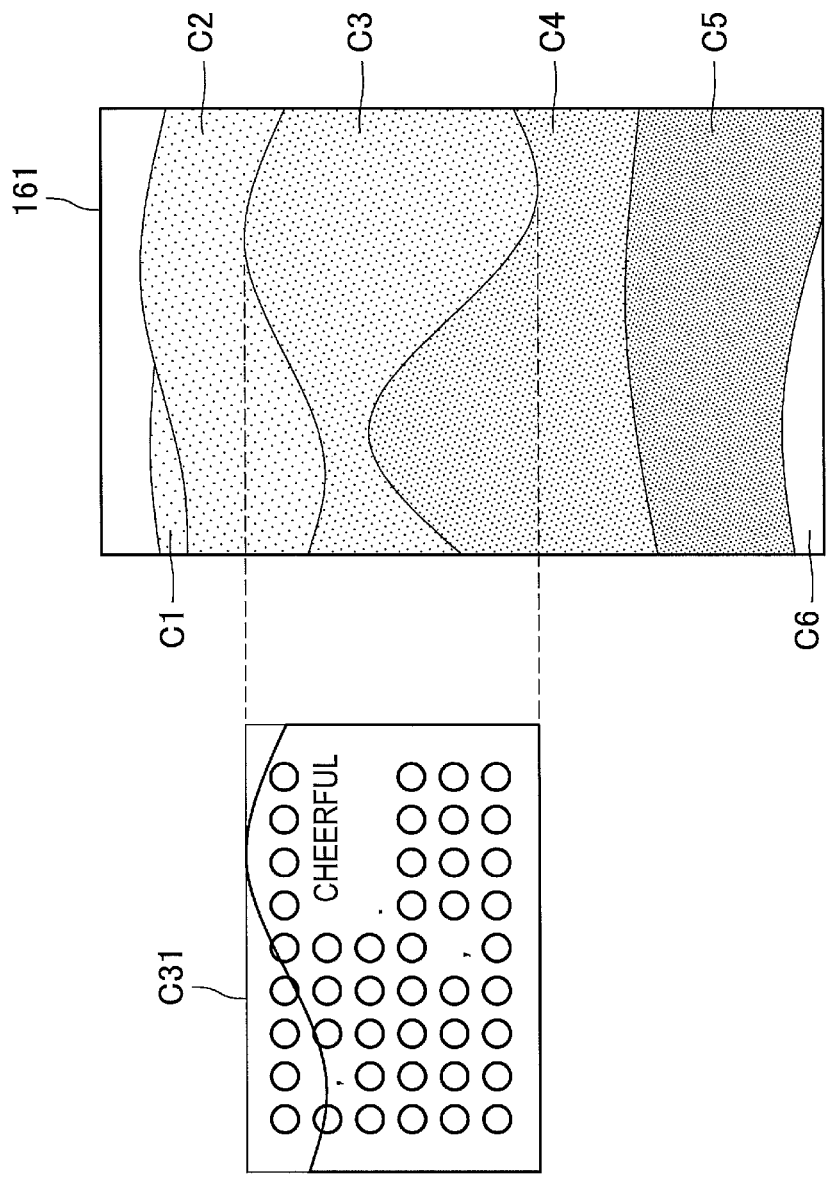
FIG. 6 is a view showing a display example when predetermined text data is contained in content.

FIG. 6 is a view showing a display example when predetermined text data is contained in content. As shown in FIG. 6, it is assumed that a keyword "Cheerful" selected by a user is contained in content displayed in the content display region C3. In this case, the recognizing part 113 acquires the position of a region where the keyword "Cheerful" contained in content is present by the recognition of the content, and then the display controller 111 may determine the position of a display target region C31 in content in such a manner that the timing, in which the position of the region where the keyword "Cheerful" is present is located within the content display region C3, is present.

The predetermined text data may be text data other than the keyword selected by a user. For example, the predetermined text data may be text data registered beforehand by users or may be a predetermined grammatical part of speech (for example, proper nouns, conjunctions, or the like) registered beforehand as dictionary data. The predetermined text data may be text data (for example, a performer of content and the like) extracted from the content viewing history by users and the like.

Figure 7:
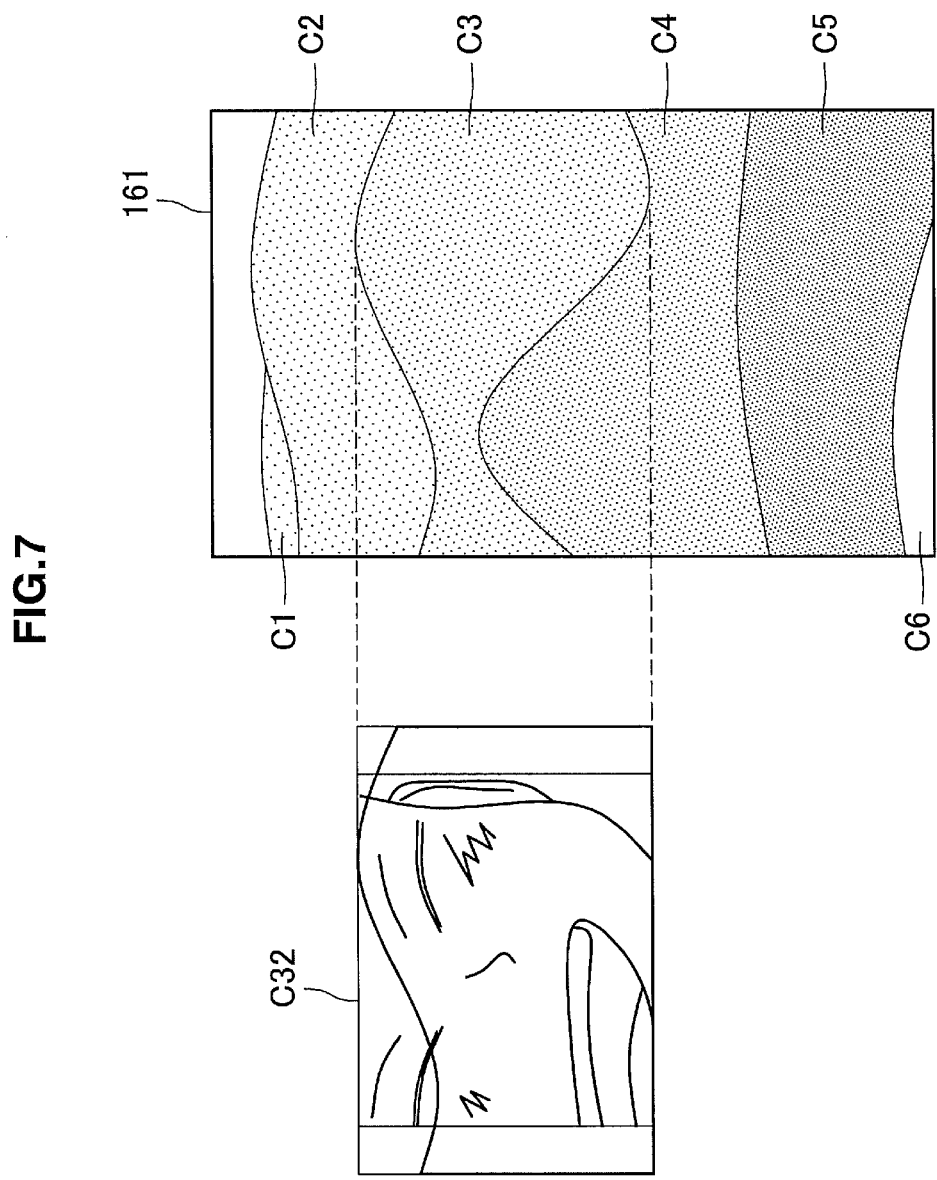
FIG. 7 is a view showing a display example when a predetermined object is contained in content.

When a predetermined object is contained in content, the predetermined region may be a region where the predetermined object is present, for example. FIG. 7 is a view showing a display example when a predetermined object is contained in content. As shown in FIG. 7, it is assumed that a face region is contained in content displayed in the content display region C3. In this case, the recognizing part 113 may acquire the position of the face region contained in content by the recognition of the content, and then the display controller 111 may adjust the position of a display target region C32 in the content in such a manner that the position of the face region may be present within the content display region C3.

The predetermined object may be an object other than the face region. For example, the predetermined object may be an object registered beforehand by users or may be a predetermined object registered beforehand as dictionary data.

The description above describes an example in which the position of the predetermined region contained in content is acquired as the recognition result, and then the boundary lines are fluctuated according to the recognition result but the boundary lines may be fluctuated according to the priority associated with content. In this case, the priority acquiring part 112 may acquire the priority associated with content, and then the display controller 111 may fluctuate the boundary lines according to the priority acquired by the priority acquiring part 112.

Herein, a technique of acquiring the priority by the priority acquiring part 112 is not particularly limited. The priority acquiring part 112 may acquire a value input by a user as the priority or may acquire the priority by calculating the priority.

As the technique of inputting a value by a user, various techniques are assumed as described above. The priority acquiring part 112 may acquire the priority input by the priority input part 220. A technique of calculating the priority by the priority acquiring part 112 is not particularly limited. For example, the priority acquiring part 112 may calculate the priority based on various kinds of information associated with content (for example, evaluation of content, a content viewing history, and a predetermined time relating to content, and the like).

For example, the priority acquiring part 112 may calculate the priority of content, which is highly evaluated, to be higher. The priority acquiring part 112 may analyze a user's preference from the content viewing history, and then may calculate the priority of content closer to the user's preference to be higher. The priority acquiring part 112 may calculate the priority of content closer to a predetermined time (for example, time of opening content to public, sales start time of content, and the like) relating to the content from the present to be higher.

Figure 8:
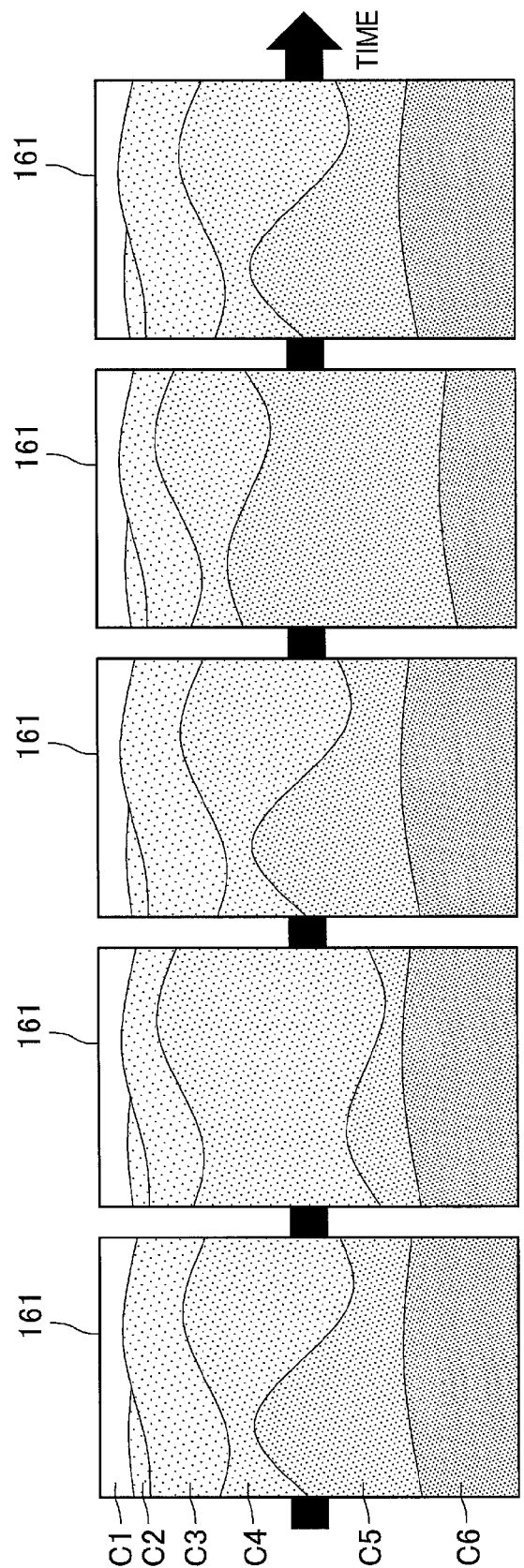
FIG. 8 is a view showing a display example when the reference positions of fluctuations of the boundary lines are changed according to priority.

A manner of fluctuating the boundary lines according to the priority is not particularly limited. For example, the display controller 111 may change a predetermined parameter of fluctuations of the boundary lines according to the priority. For example, the display controller 111 may change the reference positions of fluctuations of the boundary lines as a predetermined parameter according to the priority. FIG. 8 is a view showing a display example when changing the reference positions of fluctuations of the boundary lines according to the priority.

As shown in FIG. 8, it is assumed that content whose priority is higher than the priority of the other content is displayed in the content display region C4. In this case, the display controller 111 may change the reference positions of fluctuations of the boundary lines between the content display region C4 and regions adjacent to the content display region C4. For example, as shown in FIG. 8, the display controller 111 may change the reference positions of fluctuations of the boundary lines in such a manner as to enlarge the content display region C4. The display controller 111 may temporarily change the reference positions of the boundary lines.

Figure 9:
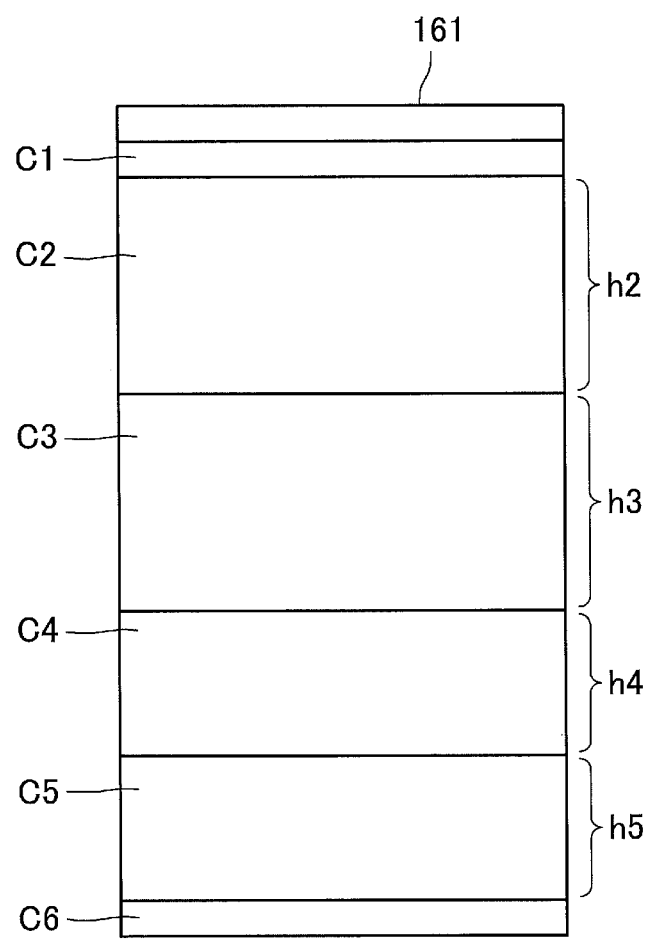
FIG. 9 is a view showing a display example when the reference positions of fluctuations of the boundary lines are changed according to priority.

FIG. 9 is a view for describing an example of changing the reference positions of fluctuations of the boundary lines according to priority. In FIG. 9, the distance between the reference positions of fluctuations of the boundary lines is indicated as h2 to h5. Herein, when the priority of the content of each of the content display regions C2 and C3 is higher than the priority of the content of each of the content display regions C4 and C5, the display controller 111 may change the reference positions of fluctuations of the boundary lines in such a manner as to enlarge each of the content display regions C2 and C3 as shown in FIG. 9.

Figure 10:
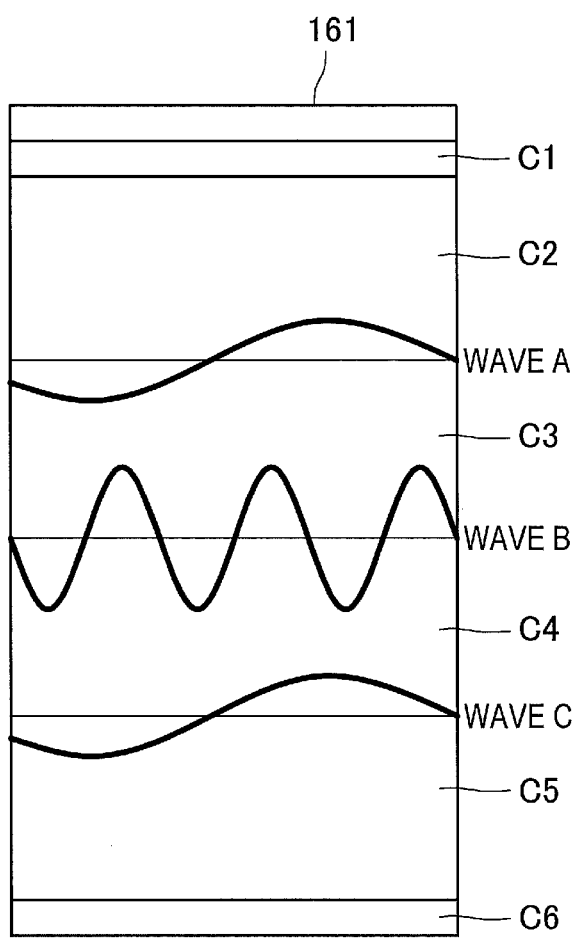
FIG. 10 is a view for describing an example of changing wave-like cycles of the boundary lines according to priority.

The display controller 111 may change the change speed of the boundary lines as a predetermined parameter according to priority, for example. Herein, various speeds are assumed as the change speed of the boundary lines. For example, the change speed of the boundary lines may be wave-like cycles of the boundary lines. FIG. 10 is a view for describing an example of changing the wave-like cycles of the boundary lines according to priority.

Also in the example shown in FIG. 10, the wave-like shape of the boundary line between the content display region C3 and the content display region C2 adjacent thereto is a wave A, the wave-like shape of the boundary line between the content display region C4 and the content display region C3 adjacent thereto is a wave B, and the wave-like shape of the boundary line between the content display region C5 and the content display region C4 adjacent thereto is a wave C similarly as the example shown in FIG. 5.

Herein, when the priority of the content of the content display region C4 is higher than the priority of the other content, the display controller 111 may set the wave-like cycle (the wave-like shape of the wave B) of the boundary line between the content display region C4 and the content display region C3 adjacent thereto to be higher. When the cycle is changed as described above, it is expected that a possibility that the line of sight of a user is turned to the content display region C4 increases.

The change speed of the boundary line is not limited to the wave-like cycle of the boundary line. For example, the change speed of the boundary lines may be the vibration speed of the boundary line. A description is given with reference to the example shown in FIG. 10. When the priority of the content of the content display region C3 is higher than the priority of the content display region C5, the display controller 111 may set the vibration speed of the wave-like shape of the boundary line (the wave-like shape of the wave A) between the content display region C3 and the content display region C2 adjacent thereto to be higher. When the vibration speed is changed as described above, it is expected that a possibility that the line of sight of a user is turned to the content display region C3 increases.

Figure 11:
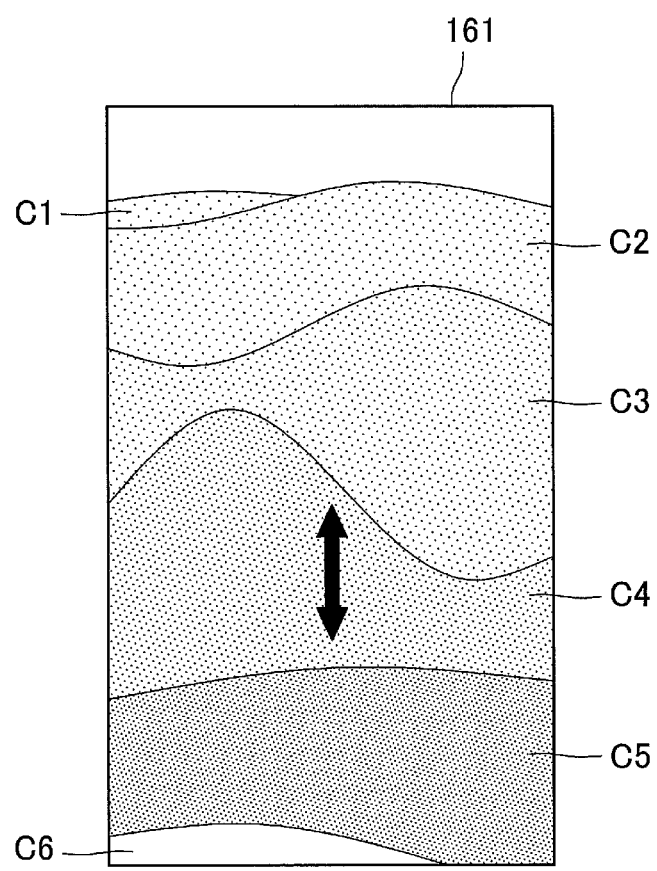
FIG. 11 is a view showing a display example when a display target region in content is moved within the content at a speed according to priority.

In the description above, the case is assumed in which the display target region in content is fixed within the content but the display target region in content may be moved within the content. More specifically, the display controller 111 may move the display target region in content within the content at a speed according to priority. FIG. 11 is a view showing a display example in the case of moving the display target region in content within the content at a speed according to priority.

For example, the display controller 111 may move the display target region in content within the content at a speed according to priority and may move the display target region in content having a higher priority at a higher speed within the content. When the moving speed is changed as described above, it is expected that a possibility that the line of sight of a user is turned to a content display region having a higher moving speed increases.

When the display controller 111 moves the display target region in the content displayed in the content display region C4 in a predetermined direction (for example, downward), for example, the content displayed in the content display region C4 seems to move in a direction opposite (for example, upward) to the predetermined direction. On the other hand, when the display controller 111 moves the display target region in the content displayed in the content display region C4 in a predetermined direction (for example, upward), the content displayed in the content display region C4 seems to move in a direction opposite (for example, downward) to the predetermined direction.

In the description above, the outline of the functions of the display control device 10 according to an embodiment of the present disclosure is described.

[1-6. Case where End of List Reaches Display Screen]

Herein, in the case where the list can be moved according to a user's operation, when the end of the list reaches the display screen 161, it is very convenient to users to perform a display indicating the state. The following description describes a display example when the end of the list reaches the display screen 161. The following description is given mainly based on a case where the list is moved according to a drag operation by a user. However, the operation performed by a user is not limited to the drag operation.

Figure 12:
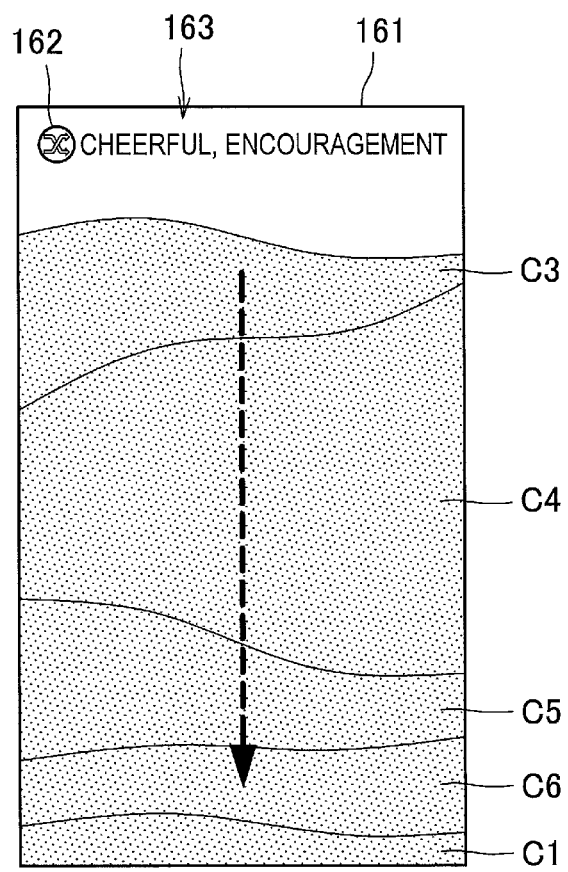
FIG. 12 is a view showing a first display example when the end of a list reaches a display screen.

FIG. 12 is a view showing a first display example when the end of the list reaches the display screen 161. It is assumed that, as a result of moving the list according to a drag operation by a user, the end of the list reaches the display screen 161 as shown in FIG. 12. In this case, the display controller 111 may control the display part in such a manner that a content display region C1 which is the head of the list is displayed next to a content display region C6 which is the end of the list as shown in FIG. 12. This first display example is considered to be particularly highly convenient to users when the display is set so that, after completing the reproduction of the content at the end of the list, the reproduction of the content at the head of the list is automatically started.

Figure 13:
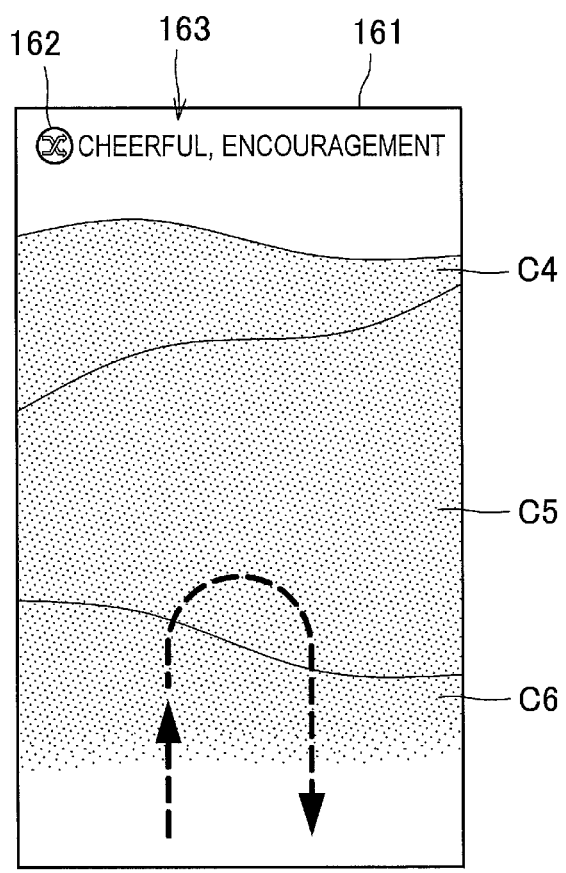
FIG. 13 is a view showing a second display example when the end of a list reaches a display screen.

FIG. 13 is a view showing a second display example when the end of the list reaches the display screen 161. It is assumed that, as a result of moving the list according to a drag operation by a user, the end of the list reaches the display screen 161 as shown in FIG. 13. In this case, as shown in FIG. 13, the display controller 111 may control the display part in such a manner that a predetermined representation (for example, a representation of foggy state) is displayed. Such a predetermined representation may be displayed in such a manner as to move towards the inner side of the display screen 161 from the end of the list, and rebound like a spring to return to the original position.

Figure 14:
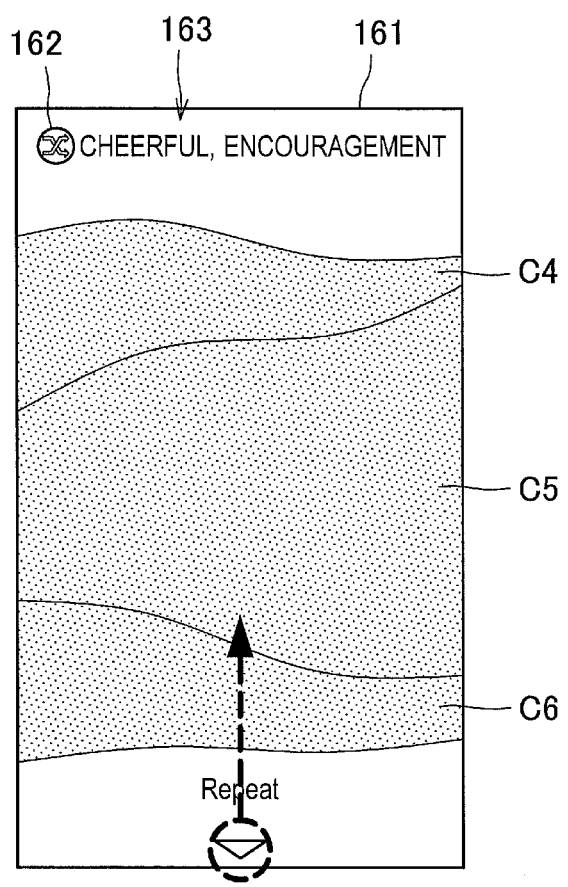
FIG. 14 is a view showing a third display example when the end of a list reaches a display screen.

FIG. 14 is a view showing a third display example when the display screen 161 reaches the end of the list. It is assumed that, as a result of moving the list according to a drag operation by a user, the end of the list reaches the display screen 161 as shown in FIG. 14. In this case, the display controller 111 may control the display part in such a manner that a predetermined object (for example, a mark with "Repeat") is displayed as shown in FIG. 14. When the predetermined object is selected by a user, the display controller 111 may control the display part in such a manner that a content display region C1 which is the head of the list is displayed next to a content display region C6 which is the end of the list according to a drag operation by a user.

In the description above, a display example when the end of the list reaches the display screen 161 is described.

[1-7. Another Appearance Example of Display Control Device]

Figure 15:
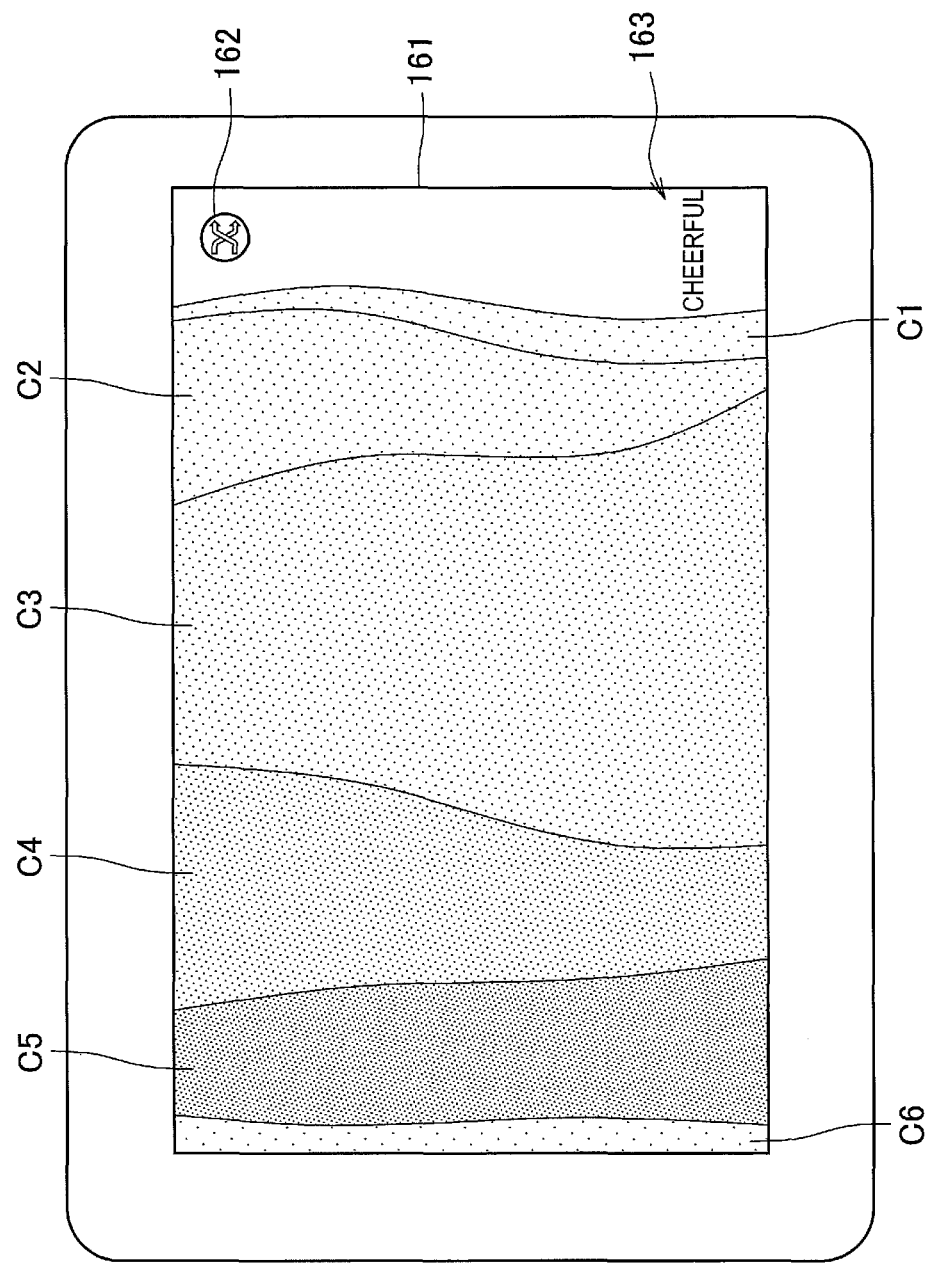
FIG. 15 is a view showing another appearance example of a display control device according to an embodiment of the present disclosure.

Then, another appearance example of the display control device 10 according to an embodiment of the present disclosure is described. FIG. 15 is a view showing another appearance example of the display control device 10 according to an embodiment of the present disclosure. In the example shown in FIG. 15, the display controller 111 controls the display part in such a manner that a list in which a plurality of content display regions are arranged is displayed on the display screen 161 similarly as the example shown in FIG. 1. For example, the display control device 10 can be controlled in such a manner that content display regions C1 to C6 are displayed on the display screen 161 as an example of the list as shown in FIG. 15.

However, the example shown in FIG. 15 and the example shown in FIG. 1 are different from each other in the direction of content of content (for example, content displayed in each content display region, a selected display mode displayed in the selected display mode display region 162, a selected keyword displayed in the selected keyword display region 163, and the like) displayed on the display screen 161. More specifically, the display controller 111 can also change the direction of content to be displayed according to the direction in which the display screen 161 is placed.

In the description above, another appearance example of the display control device 10 according to an embodiment of the present disclosure is described.

[1-8. Transmission and Reception of Content between Devices]

Figure 16:
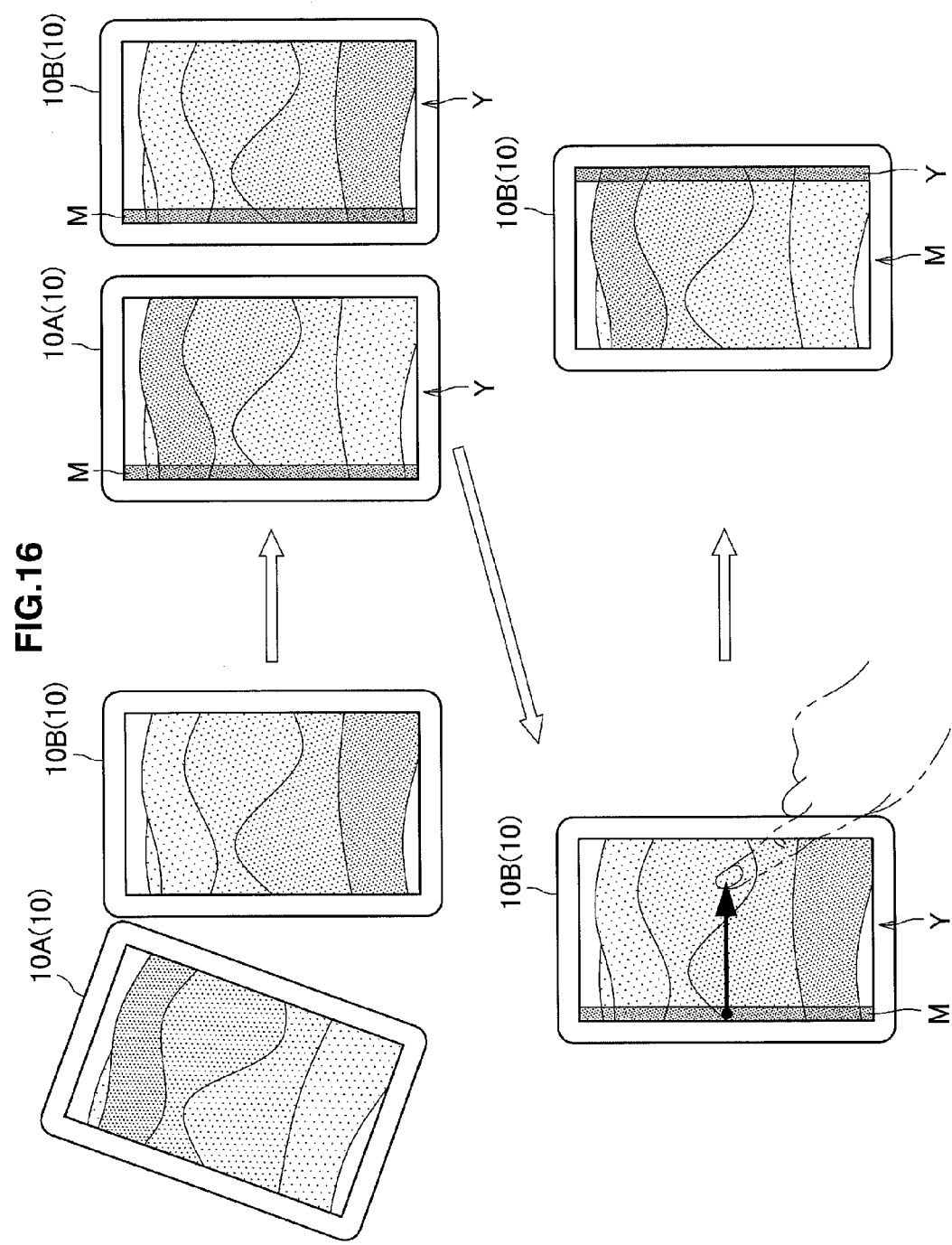
FIG. 16 is a view for describing an example when content is transmitted and received between a plurality of display control devices.
Figure 17:
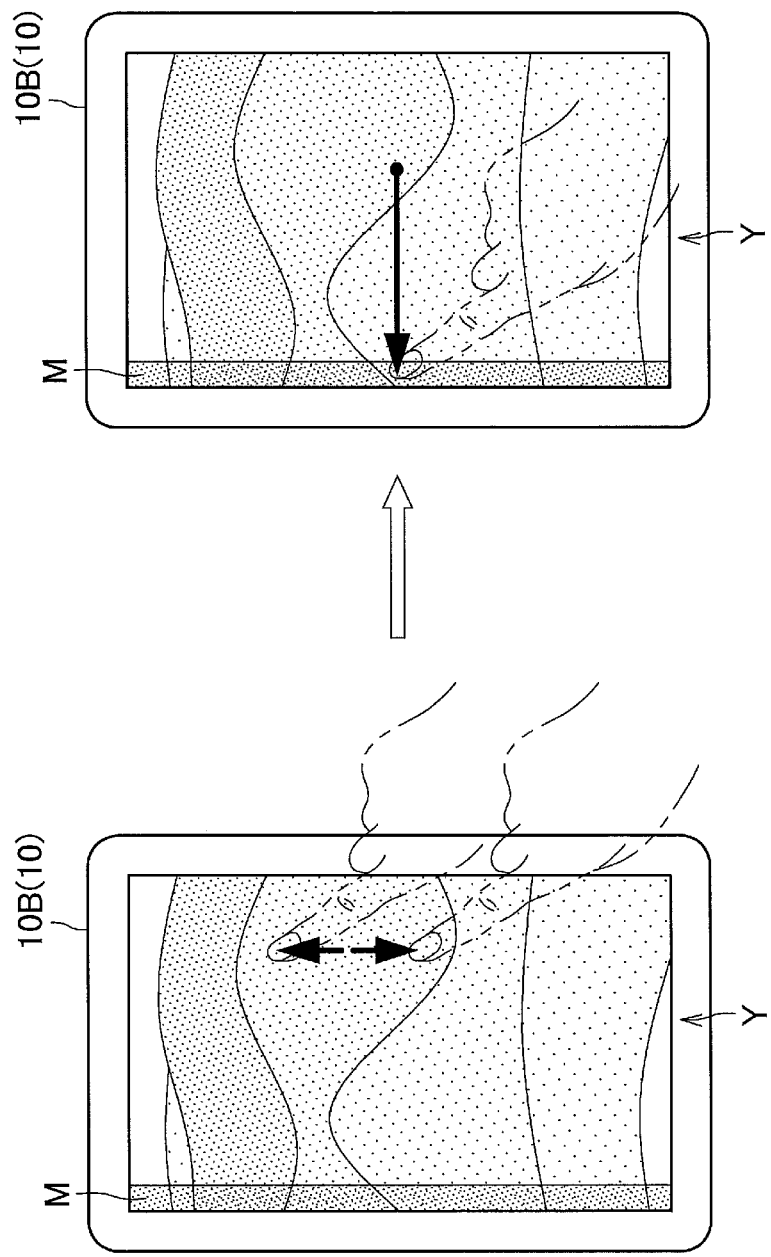
FIG. 17 is a view for describing an example when content is transmitted and received between a plurality of display control devices.
Figure 18:
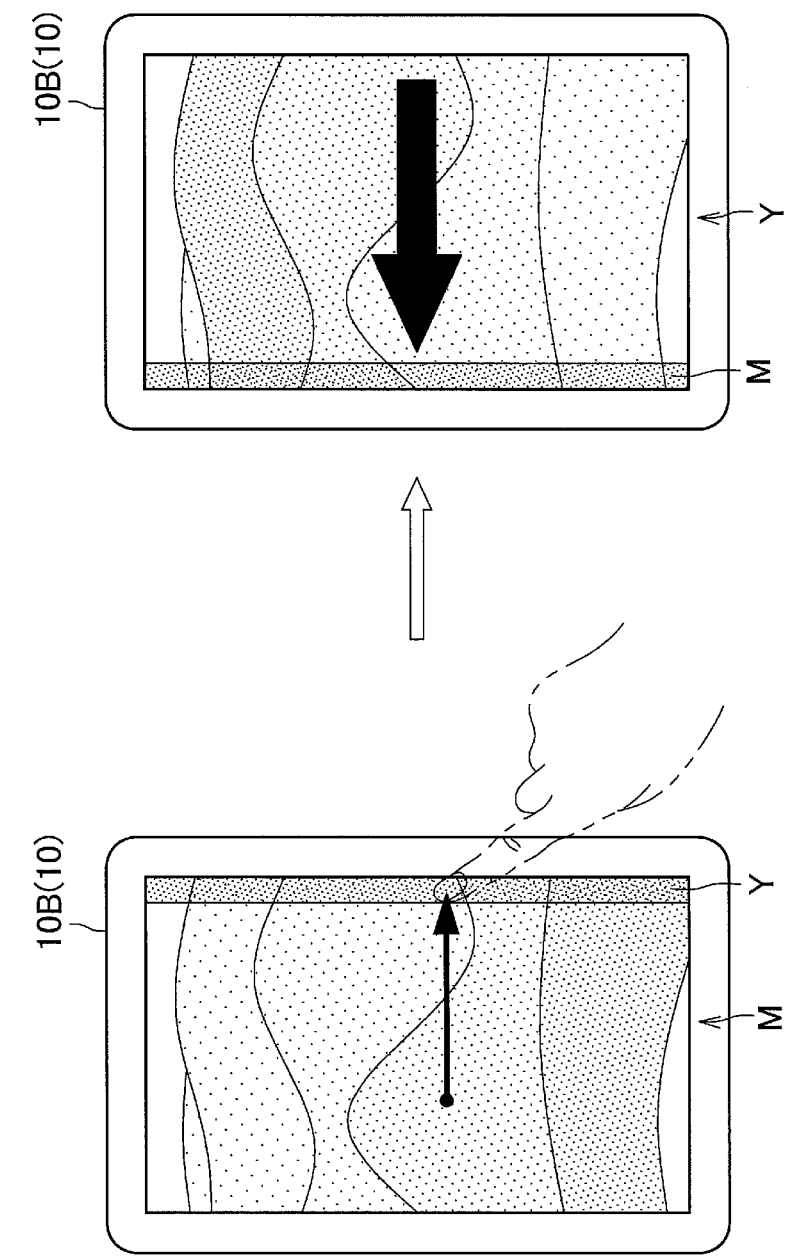
FIG. 18 is a view for describing an example when content is transmitted and received between a plurality of display control devices.

The description above is given mainly based on the case where the number of the display control devices 10 is one. Hereinafter, an example of a technique of, in the case where two or more of the display control devices 10 are provided, transmitting and receiving content among the two or more of the display control devices 10 is described. FIG. 16 to FIG. 18 are views for describing the example of transmission and reception of content among the two or more of the display control devices 10. Herein, as an example of the two or more of the display control devices 10, a display control device 10A and a display control device 10B are used.

First, a connection is generated between the display control device 10A and the display control device 10B. An opportunity of generating the connection may be detection of collision of the display control device 10A and the display control device 10B but is not particularly limited thereto. In the connection generation, each device may receive some parameters (for example, the wave-like amplitudes, cycles, and the like of the boundary lines) from a mating device, and may utilize the parameters for changing the boundary lines displayed and controlled by the own device.

For example, each device may be controlled in such a manner that content of a mating device is displayed. In the example shown in FIG. 16, each device is controlled so that content of the own device is present in an own region M and content of a mating device is displayed on a mating region Y. For example, the own region M shows the content of the storage area in the storage 130 of the own device and the mating region Y shows the content of the storage area in the storage 130 of the mating device.

For example, when an operation of indicating that the content present in the own region M is displayed is performed by a user's operation, the display is controlled so that the content present in the own region M is displayed as shown in FIG. 16. Instead, when the operation is performed, the content which is controlled to be displayed in the mating region Y may not be displayed. The operation of indicating that the content present in the own region M is displayed is realized by a drag operation from the own region M to the mating region Y as shown in FIG. 16.

Users can input the priority of the content by performing a predetermined operation to the content display region displayed in the mating region Y. For example, a user can input the priority according to motions (for example, speed, acceleration, and the like of a finger) of a finger moving while touching the content display region as shown in FIG. 17. The priority input herein may be utilized for changing predetermined parameters relating to the fluctuations of the boundary lines. For example, the display controller 111 may change the reference positions of the fluctuations of the boundary lines according to the priority as shown in FIG. 17.

Then, when an operation of copying content to the own region M from the mating region Y is performed, the controller 110 can copy the content to the own region M from the mating region Y. The operation of copying the content to the own region M from the mating region Y is realized by a drag operation from the content display region displayed in the mating region Y to the own region M as shown in FIG. 17.

When an operation of copying content to the mating region Y from the own region M is similarly performed, the controller 110 can copy the content to the mating region Y from the own region M. The operation of copying the content to the mating region Y from the own region M is realized by a drag operation from the content display region displayed in the own region M to the mating region Y as shown in FIG. 18.

Due to the copying of content to the mating region Y, certain content may be copied to the own region M from the mating region Y. In this case, the content copied to the own region M from the mating region Y may be content specified (for example, recommended content and the like) by a user of the mating device.

In the description above, an example of a technique of, in the case where two or more of the display control devices 10 are provided, transmitting and receiving content among the two or more of the display control devices 10 is described.

[1-9. Hardware Configuration Example]

Figure 19:
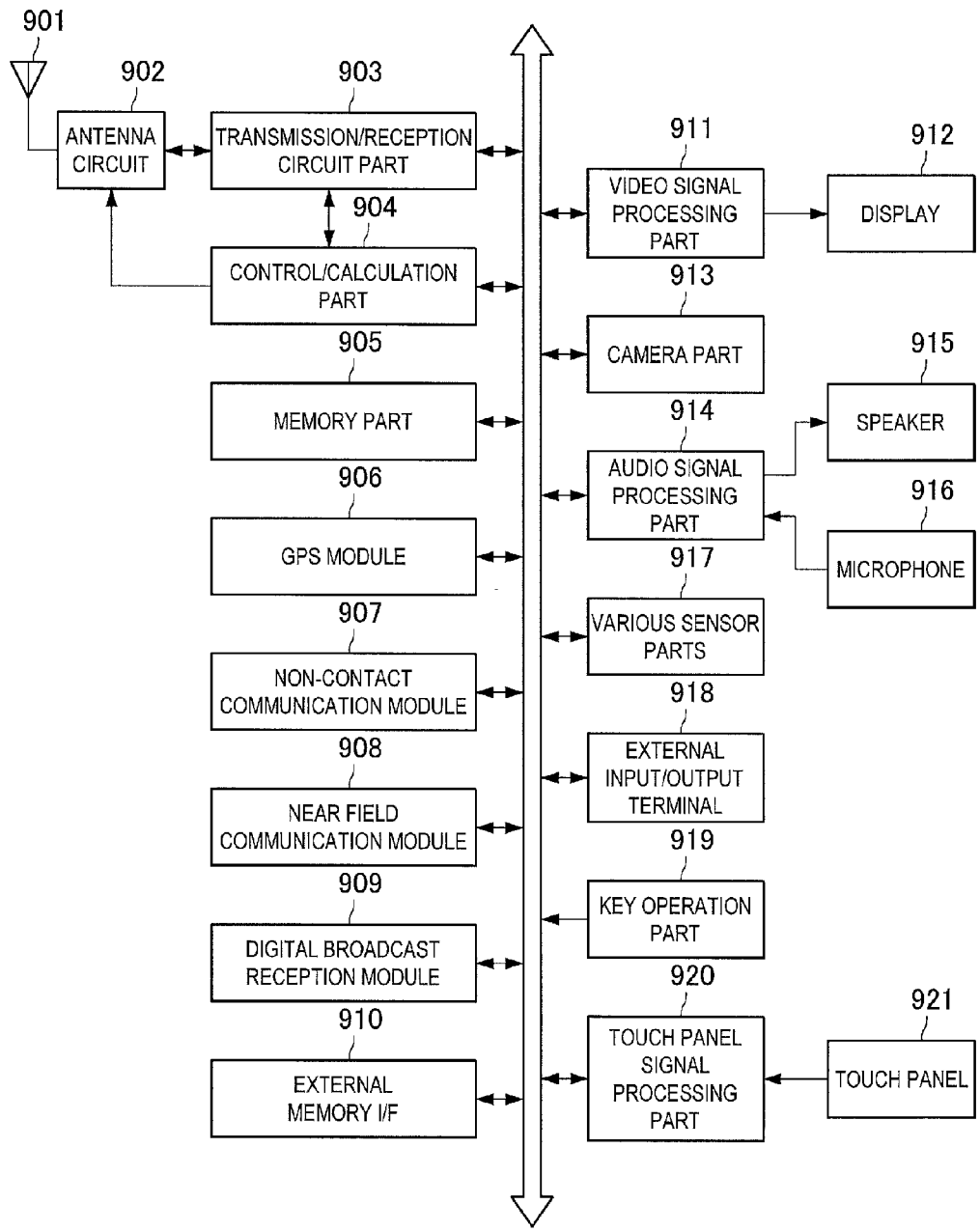
FIG. 19 is a diagram showing a hardware configuration example of a display control device according to an embodiment of the present disclosure.

Next, a hardware configuration example of the display control device 10 will be described. FIG. 19 is a diagram showing a hardware configuration example of the display control device 10 according to an embodiment of the present disclosure. However, the hardware configuration example shown in FIG. 19 is merely an example of the hardware configuration of the display control device 10. Accordingly, the hardware configuration of the display control device 10 is not limited to the example shown in FIG. 19. Note that, hereinafter, the description will be continued mainly assuming the case in which the display control device 10 according to the present embodiment is, for example, a highly-functional mobile phone terminal or tablet terminal having a touch panel on a display panel.

In the example shown in FIG. 19, a communication antenna 901 is a built-in antenna, for example, and performs transmission/reception of a telephone call and an e-mail through a mobile phone network and a public radio communication network, downloading of various application programs including the display control program according to the present embodiment, and transmission/reception of signal waves for communicating with the Internet or the like.

An antenna circuit 902 includes an antenna changer, a matching circuit, a filter circuit, and the like, and a transmission/reception circuit part 903 performs frequency conversion, modulation/demodulation, and the like of signals transmitted and received through the mobile phone network and the public radio communication network. A speaker 915 is a speaker provided to the display control device 10 according to the present embodiment, and is used for music playback, receiver sound output, and ringtone output, for example. A microphone 916 is used for collecting external sound, transmitter sound, and the like.

An audio signal processing part 914 includes an amplification circuit for the speaker 915, an amplification circuit for the microphone 916, an expansion-decoding circuit for expansion-decoding compression-coded audio data supplied from a control/calculation part 904, a digital/analog converter circuit for converting the expansion-decoded digital audio data into an analog audio signal, an analog/digital converter circuit for converting an analog audio signal input from the microphone 916 into a digital audio data, a compression-coding circuit for compression-coding the digital audio data, and the like.

A video signal processing part 911 includes an expansion-decoding circuit for expansion-decoding compression-coded video data supplied from the control/calculation part 904, a display panel drive circuit for causing digital video after the expansion-decoding and digital broadcasting video received by a digital broadcast reception module 909, which will be described later, to be displayed on a display panel 912, and the like. Further, in the case of the present embodiment, the video signal processing part 911 generates video signals for displaying a desktop image, various menu images, a virtual touch area image compatible with a position on a touch panel, which are supplied from the control/calculation part 904, and causes those images to be displayed on the display panel 912.

A key operation part 919 includes hard keys provided on a casing of the display control device 10 according to the present embodiment, the peripheral circuit thereof, and the like. The key operation part 919 converts a hard key-pressing operation input performed by a user into an electric signal, performs amplification and analog/digital conversion on the operation input signal, and transmits the operation input data after the analog/digital conversion to the control/calculation part 904.

An external input/output terminal 918 includes, for example, a connector for connecting a cable used at the time of performing data communication through a cable, an interface circuit for external data communication, a charging terminal used at the time of charging an internal battery through a power cable, and the charging interface circuit thereof. Various application programs including a display control program of the present embodiment may be acquired through the external input/output terminal 918.

Further, the external memory I/F 910 includes a slot for external memory to and from which a storage medium such as external memory is attached and detached, an interface circuit for external memory data communication, and the like. Various application programs including a display control program of the present embodiment may be acquired through a storage medium such as external memory inserted to the external memory I/F 910. Note that the storage medium may store a display control application program for controlling the display, which will be described later, of the display control device 10 according to the present embodiment.

A near field communication module 908 includes a communication antenna for near field radio waves such as a wireless LAN and a Bluetooth (registered trademark), and a near field communication circuit. Various application programs including a display control program of the present embodiment may be acquired through the near field communication module 908.

A digital broadcast reception module 909 includes an antenna for receiving so-called digital television broadcasting, digital radio broadcasting, and the like, and a tuner. The digital broadcast reception module 909 is not only capable of receiving one channel of digital television broadcasting, but also capable of simultaneously receiving two or more channels of digital television broadcasting. Further, the digital broadcast reception module 909 is also capable of receiving data superimposed on the digital broadcasting.

Note that, for example, after being compressed by the control/calculation part 904, the digital broadcasting data received by the digital broadcast reception module 909 can be stored (that is, recorded) in a memory part 905. Further, various application programs including a display control program according to the present embodiment may be broadcasted as one of the display broadcasting data.

A camera part 913 includes an image sensor for shooting a still image and a moving image, an optical system and the peripheral circuit thereof, and a drive circuit of a light for emitting fill light for shooting. The still image data and the moving image data at the time of shooting performed by the camera part 913 are transmitted to the video signal processing part 911 as preview video data. In this way, at the time of shooting using the camera, preview video is displayed on the display panel 912. Further, in the case of recording the still image data and the moving image data shot by the camera part 913 are to be recorded, the still image data and the moving image data that have been shot are transmitted to the control/calculation part 904 and compressed, and then stored in the memory part 905 or an external memory connected to the external memory I/F 910.

A non-contact communication module 907 performs non-contact communication through a non-contact communication antenna, the non-contact communication being used for radio frequency identification (RFID) and a non-contact IC card, for example.

A global positioning system (GPS) module 906 has a GPS antenna, and determines a latitude and a longitude of a current position of the display control device 10 by using GPS signals from GPS positioning satellites. The GPS data (information indicating latitude/longitude) obtained by the GPS module 906 is transmitted to the control/calculation part 904. In this way, the control/calculation part 904 can recognize a current position and the movement of the display control device 10.

Various sensor parts 917 include various detection sensors such as a terminal state detection sensor for detecting a state of the display control device 10 according to the present embodiment, and the peripheral circuits thereof. As the various sensor parts 917, there are given as examples a tilt sensor, an acceleration sensor, an orientation sensor, a temperature sensor, a humidity sensor, and a light intensity sensor. Detection signals obtained by the various sensor parts 917 are transmitted to the control/calculation part 904. In this way, the control/calculation part 904 can recognize states (tilt, acceleration, orientation, temperature, humidity, light intensity, and the like) of the display control device 10.

A touch panel 921 is an input operation part having a detection plane capable of detecting an operation input performed by a user, and is formed of a transparent touch sensor screen sensor provided over the entire surface of the display panel 912. A touch panel signal processing part 920 measures a touch detection position and a touch trajectory on the touch panel 921, touch duration, a touch interval, and the like, and transmits the measured data to the control/calculation part 904 as touch detection data. Note that the touch panel 921 and the touch panel signal processing part 920 support a so-called multi-touch input.

The memory part 905 includes built-in memory provided inside the display control device 10 and detachable card-type memory. As the detachable card-type memory, there is given as an example a card storing so-called subscriber identity module information (SIM). The built-in memory includes read only memory (ROM) and random access memory (RAM). The ROM stores an operating system (OS), a control program for the control/calculation part 904 to control each part, various initial setting values, dictionary data, character prediction conversion dictionary data, various types of sound data, various application programs including a display control program according to the present embodiment, and the like.

The ROM includes rewritable ROM such as NAND-type flash memory or electrically erasable programmable read-only memory (EEPROM). The ROM can save e-mail data, data of a telephone book and an e-mail address book, data of still image content and moving image content, and in addition, can save various user setting values and the like. The RAM stores data at any time, as a workspace and a buffer space for the control/calculation part 904, to perform various types of data processing.

The control/calculation part 904 includes a central processing unit (CPU), and controls each of the transmission/reception circuit part 903, the video signal processing part 911, the audio signal processing part 914, the GPS module 906, the non-contact communication module 907, the near field communication module 908, the digital broadcast reception module 909, the external memory I/F 910, the camera part 913, the various sensor parts 917, the external input/output terminal 918, the key operation part 919, the touch panel signal processing part 920, and the like, and performs various types of computing as necessary.

Further, the control/calculation part 904 executes a control program stored in the memory part 905 and various application programs including a display control program according to the present embodiment. In the case of the present embodiment, by executing the display control program, the control/calculation part 904 functions as an information allocation control part that allocates predetermined information such as letters to be described later in the respective multiple directions on a panel plane having as its approximate center a position of a user's desired operation input on the touch panel plane.

Further, in the case of the present embodiment, by executing the display control program, the control/calculation part 904 functions as an information input control part when a direction of an operation input performed by the user on the touch panel plane approximately corresponds to any one of the multiple directions, the information input control part inputting, as information selected by the user, the predetermined information allocated to the approximately corresponding direction. In addition, the display control device 10 according to the present embodiment may include structural elements that are included in a general mobile information terminal, such as a clock part for measuring time period or time, a battery for supplying each part with power, and a power management IC for controlling the power.

2. Conclusion

As described above, according to an embodiment of the present disclosure, it is possible to provide a display control device having a display controller which generates a control signal for controlling a display part in such a manner that a boundary line between a content display region and a region adjacent to the content display region has a wave-like shape and the boundary line is displayed while being fluctuated with the progress of time and an output part which outputs the control signal to the display part. According to this configuration, it is possible to allow users to view content while giving a stronger impression to the users.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Further, a program for causing hardware, such as a CPU, ROM and RAM built into a computer, to exhibit functions similar to the configuration included in the above described display control apparatus 10 can be created. Further, a recording medium can also be provided which records these programs and is capable of performing reading to the computer.

Additionally, the present technology may also be configured as below.

(1)

A display control device including:

a display controller which generates a control signal for controlling a display part in such a manner that a boundary line between a content display region and a region adjacent to the content display region has a wave-like shape and the boundary line is displayed while being fluctuated with progress of time; and an output part which outputs the control signal to the display part.

(2)

The display control device according to (1), including:

a priority acquiring part which acquires priority associated with content wherein the display controller fluctuates the boundary line according to the priority.

(3)

The display control device according to (2), wherein the priority acquiring part acquires a value input by a user as the priority.

(4)

The display control device according to (2), wherein the priority acquiring part acquires the priority by calculating the priority.

(5)

The display control device according to any one of (2) to (4), wherein the display controller changes a predetermined parameter relating to fluctuations of the boundary line according to the priority.

(6)

The display control device according to (5), wherein the display controller changes a change speed of the boundary line as the predetermined parameter according to the priority.

(7)

The display control device according to (6), wherein the change speed is a wave-like cycle of the boundary line.

(8)

The display control device according to (6), wherein the change speed is a vibration speed of the boundary line.

(9)

The display control device according to (5), wherein the display controller changes a reference position of the fluctuations of the boundary line as the predetermined parameter according to the priority.

(10)

The display control device according to (5), wherein the display controller moves a display target region in the content within the content at a speed according to the priority.

(11)

The display control device according to any one of (1) to (10), including:

a recognizing part which acquires a position of a predetermined region contained in content as a recognition result by recognition of the content, wherein the display controller fluctuates the boundary line according to the recognition result.

(12)

The display control device according to (11), wherein the display controller changes a position of a display target region in the content according to the position of the predetermined region.

(13)

The display control device according to (12), wherein the predetermined region is a region where, when predetermined text data is contained in the content, the predetermined text data is present.

(14)

The display control device according to (12), wherein the predetermined region is a region where, when a predetermined object is contained in the content, the predetermined object is present.

(15)

The display control device according to any one of (1) to (14), wherein the boundary line is a boundary line between the content display region and another content display region adjacent to the content display region.

(16)

A display control method including:

generating a control signal for controlling a display part in such a manner that a boundary line between a content display region and a region adjacent to the content display region has a wave-like shape and the boundary line is displayed while being fluctuated with progress of time; and outputting the control signal to the display part.

(17)

A computer-readable recording medium having a program recorded thereon, the program causing a computer to function as a display control device, the display control device including:

a display controller which generates a control signal for controlling a display part in such a manner that a boundary line between a content display region and a region adjacent to the content display region has a wave-like shape and the boundary line is displayed while being fluctuated with progress of time; and an output part which outputs the control signal to the display part.

REFERENCE SIGNS LIST

10 (10A, 10B) display control device
20 reading device
161 display screen
162 selected display mode display region
163 selected keyword display region
111 display controller
110 controller
112 priority acquiring part
113 recognizing part
120 operation part
130 storage
140 communication part
150 output part
160 display part
211 reading part
212 reading part
220 priority input part
230 priority output part
C1 to C6 content display region
C31, C32 display target region

The invention claimed is:

1. A display control device comprising:
   a display controller which generates a control signal for controlling a display part in such a manner that a boundary line between a content display region and a region adjacent to the content display region has a wave-like shape and the boundary line is displayed while being fluctuated with progress of time; and
   an output part which outputs the control signal to the display part.

2. The display control device according to claim 1, comprising:
   a priority acquiring part which acquires priority associated with content,
   wherein the display controller fluctuates the boundary line according to the priority.

3. The display control device according to claim 2,
   wherein the priority acquiring part acquires, as the priority, a value input by a user.

4. The display control device according to claim 2,
   wherein the priority acquiring part acquires the priority by calculating the priority.

5. The display control device according to claim 2,
   wherein the display controller changes a predetermined parameter relating to a fluctuation of the boundary line according to the priority.

6. The display control device according to claim 5,
   wherein the display controller changes a change speed of the boundary line as the predetermined parameter according to the priority.

7. The display control device according to claim 6,
   wherein the change speed is a wave-like cycle of the boundary line.

8. The display control device according to claim 6,
   wherein the change speed is a vibration speed of the boundary line.

9. The display control device according to claim 5,
   wherein the display controller changes a reference position of the fluctuation of the boundary line as the predetermined parameter according to the priority.

10. The display control device according to claim 5,
    wherein the display controller moves a display target region in the content within the content at a speed according to the priority.

11. The display control device according to claim 1, comprising:
    a recognizing part which acquires a position of a predetermined region contained in content as a recognition result by recognition of the content,
    wherein the display controller fluctuates the boundary line according to the recognition result.

12. The display control device according to claim 11,
    wherein the display controller changes a position of a display target region in the content according to the position of the predetermined region.

13. The display control device according to claim 12,
    wherein the predetermined region is a region where, when predetermined text data is contained in the content, the predetermined text data is present.

14. The display control device according to claim 12,
    wherein the predetermined region is a region where, when a predetermined object is contained in the content, the predetermined object is present.

15. The display control device according to claim 1,
    wherein the boundary line is a boundary line between the content display region and another content display region adjacent to the content display region.

16. A display control method comprising:
    generating a control signal for controlling a display part in such a manner that a boundary line between a content display region and a region adjacent to the content display region has a wave-like shape and the boundary line is displayed while being fluctuated with progress of time; and
    outputting the control signal to the display part.

17. A computer-readable recording medium having a program recorded thereon, the program causing a computer to function as a display control device, the display control device comprising:
    a display controller which generates a control signal for controlling a display part in such a manner that a boundary line between a content display region and a region adjacent to the content display region has a wave-like shape and the boundary line is displayed while being fluctuated with progress of time; and
    an output part which outputs the control signal to the display part.

* * * * *